United States Patent
Bosco et al.

(10) Patent No.: US 6,866,126 B2
(45) Date of Patent: Mar. 15, 2005

(54) SHIM ATTACHMENT

(75) Inventors: Robert Bosco, Wolcott, CT (US); Leonard Tremblay, Plainville, CT (US); Paul Guillemette, Bristol, CT (US); Arthur Lobdell, Torrington, CT (US); Carl Dambrauskas, Wolcott, CT (US); Richard Bochicchio, Glastonbury, CT (US)

(73) Assignee: Anstro Manufacturing, Inc., Wolcott, CT (US)

( * ) Notice: Subject to any disclaimer, the term of this patent is extended or adjusted under 35 U.S.C. 154(b) by 66 days.

(21) Appl. No.: 10/463,626

(22) Filed: Jun. 16, 2003

(65) Prior Publication Data

US 2003/0213659 A1 Nov. 20, 2003

Related U.S. Application Data

(63) Continuation of application No. 10/147,684, filed on May 17, 2002, now Pat. No. 6,578,680.

(51) Int. Cl.[7] .............................................. F16D 69/00
(52) U.S. Cl. .............................. 188/250 G; 188/250 F; 403/279; 403/282
(58) Field of Search .................. 188/250 G, 250 F, 188/73.37, 205 A; 403/274, 278, 279, 282, 285

(56) References Cited

U.S. PATENT DOCUMENTS

| | | | | |
|---|---|---|---|---|
| 1,919,967 A | * | 7/1933 | Thompson | 188/234 |
| 2,067,677 A | * | 1/1937 | Murphy | 188/234 |
| 2,398,006 A | * | 4/1946 | Hunt | 188/250 G |
| 3,767,018 A | * | 10/1973 | Gordon | 188/250 G |
| 4,535,874 A | * | 8/1985 | Pollinger et al. | 188/73.1 |
| 4,694,937 A | * | 9/1987 | Jonas | 188/73.1 |
| 5,363,944 A | * | 11/1994 | Thiel et al. | 188/73.31 |
| 5,480,008 A | * | 1/1996 | Hummel et al. | 188/73.37 |
| 5,601,174 A | * | 2/1997 | Schulz | 192/107 M |
| 5,816,370 A | * | 10/1998 | Verbeeten et al. | 188/73.37 |
| 6,349,803 B2 | * | 2/2002 | Brosilow | 188/73.37 |
| 6,478,125 B1 | * | 11/2002 | Russo et al. | 188/250 E |

FOREIGN PATENT DOCUMENTS

JP 251629 * 2/1990

* cited by examiner

Primary Examiner—Robert A. Siconolfi
Assistant Examiner—Devon Kramer
(74) Attorney, Agent, or Firm—Carmody & Torrance LLP

(57) ABSTRACT

A staple for assisting in the coupling of a shim to a first side surface of a backing plate in a brake assembly. In a preferred embodiment, the staple comprises a head section; a body section coupled to the head section, the body section having a concavity so as to form a recessed region therein; and a leg member, shaped for permitting a portion of the material comprising the backing plate to be displaced towards and into the recessed region as the leg member is piercing the first side surface of, and progressing into, the backing plate; and wherein upon insertion of the body section into the backing plate, the concavity of the body section causes the displaced material to fill the recessed region; whereby a shim mounted onto the first side of the backing plate and secured thereto at least in part by the head section is inhibited from movement on and separation from the first surface of the backing plate. A method of maintaining a shim against a first side surface of a backing plate with at least one staple is also disclosed.

14 Claims, 2 Drawing Sheets

SHIM ATTACHMENT

RELATED U.S. APPLICATION DATA

Continuation of application Ser. No. 10/147,684, filed on May 17, 2002, now U.S. Pat. No. 6,578,680.

BACKGROUND OF THE INVENTION

This invention relates generally to interlocking attachments for securing shims to backing plates, and in particular, to an improved interlocking attachment and method for ensuring improved mechanical attachment of the shim to the backing plate.

In a brake assembly, such as a disc brake assembly, a rotatable disc rotates with the axle of a wheel to be braked. Braking subassemblies, comprising a steel backing plate and a braking pad, may be disposed on opposite sides of the disc. As the subassemblies move inwardly under the force supplied by an actuated piston and a related caliper, the inner surfaces of the braking pads are engaged in frictional, braking contact with the disc. A high pitched and undesired brake squeal noise can be produced during such braking engagement of the pads on the disc, which may be produced by vibration of the subassemblies during braking actuation.

To reduce and/or to eliminate the undesired brake squeal noise, sound dampening shims have been used, both by original equipment manufacturers and by brake repair shops.

The sound dampening shim constructions are preferably positioned both between the actuated piston and the back surface of the related steel backing plate and also between the caliper and the back surface of its related steel backing plate.

Unfortunately, this frictional contact can cause a torque or twisting force on the shim by the related piston or caliper producing a shearing force in the adhesive of the shim. Under the extreme conditions of heat and vibration the adhesive by itself is not sufficient to prevent dislodging of the shim from the backing plate during braking.

The present inventors know of at least three embodiments to further reduce shifting of the shim during braking. The first is the use of tabs which may be provided at the edges of the shim. These tabs typically extend around the top edge of the backing plate and would assist in holding the shim in place. This arrangement however is less than satisfactory since the shim shape would have to closely match the shape of the backing plate in order for the tabs to align, thus leading to an enormous inventory to maintain complementary backing plates and shims.

An improved shim is commercially sold by the assignee of the present invention under the trademark DRIFTLOK™. A DRIFTLOK™ shim includes one or more extruded holes that align with corresponding aligned indentations in the back surface of the backing plate. Advantageously, all that is required is to ensure that each backing plate, no matter the size or shape, has the properly aligned indentations and enough surface area to support the shim. This construction yields a very desirable reduction on the shearing motion of the shim.

The present inventors however have discovered that still further improvements in the art are desirable. For example, a staple or other fastening device to further reduce or eliminate any shearing of the shim would be desirable. One such attempt at such a fastening device is described in U.S. Pat. No. 6,349,803. This patent describes the use of a retaining pin that is inserted into an opening in the shim and thereafter into an aligned hole in the backing plate. The shank of the retaining pin has outwardly projecting veins which are formed to a thread-type configuration prior to insertion of the pin into the opening in the backing plate. As described in the '803 patent, the insertion of the pin into the backing plate deforms the veins sufficiently so as to prevent the pin from screwing itself back out of the backing plate during the vibratory conditions occurring during braking operation of a disc brake assembly.

The inventors of the present invention believe that further advancements in the art are desirable. For example, one perceived disadvantage of the embodiment described in the '803 patent is the less than satisfactory coupling of the fastener to the backing plate due to the use of a predrilled hole in the backing plate. That is, as disclosed below, the use of a staple device that is driven into the backing plate causing the displacement of backing plate material into a trapped recessed region in the staple device, provides for an improved mechanical coupling arrangement between the shim and the backing plate.

The present inventors have recognized that such improvements to the state of the art are achievable. As such, the present invention overcomes the perceived deficiencies in the prior art as well as providing the objectives and advantages set forth above and below.

OBJECTS AND SUMMARY AND OBJECTIVES OF THE INVENTION

Therefore, it is an object and advantage of the present invention to provide an improved mechanical interlocking attachment for securing a shim to a backing plate in a brake assembly.

It is still a further object and advantage of the present invention to provide an improved methodology of attaching a shim to a backing plate in a brake assembly.

Further objects and advantages of this invention will become more apparent from a consideration of the drawings and ensuing description.

The invention accordingly comprises the features of construction, combination of elements, arrangement of parts and methodology that will be exemplified in the disclosure hereinafter set forth, and the scope of the invention will be indicated in the claims.

To overcome the perceived deficiencies in the prior art and to achieve the objects and advantages above and below, the present invention is, generally speaking, directed to a staple for assisting in the coupling of a shim to a first side surface of a backing plate, wherein the shim and the backing plate together comprise a braking subassembly for use in a brake assembly. In a preferred embodiment, the staple comprises a head section; a body section coupled to the head section, the body section having a concavity so as to form a recessed region therein; and a leg member, shaped for permitting a portion of the material comprising the backing plate to be displaced towards and into the recessed region as the leg member is piercing the first side surface of, and progressing into, the backing plate; and wherein upon insertion of the body section into the backing plate, the concavity of the body section causes the displaced material to fill the recessed region; whereby a shim mounted onto the first side of the backing plate and secured thereto at least in part by the head section is inhibited from movement on and separation from the first surface of the backing plate.

In a particular construction, the body section comprises an upper lip extending outwardly from the recessed region for forcing at least a portion of the displaced material towards and into the recessed region; and a lower lip extending outwardly from the recessed region for maintaining material in the recessed region; whereby the pressure of the material in the recessed region against the lower lip assists in preventing the staple from being removed from the backing plate. A shoulder may be formed intermediate the head section and the body section to assist in maintaining a proper orientation of the shim on the backing plate. In a preferred construction, the head section may be flat to accommodate a conventional shim or may be angled to accommodate a DRIFTLOK™ shim. The staple is preferably formed from C12L14 leaded steel and is also preferably formed of a harder material than the backing plate for resisting deformation of the staple as it is inserted in the backing plate.

A method of maintaining a shim against a first side surface of a backing plate with at least one staple constructed in accordance with the present invention is also disclosed.

BRIEF DESCRIPTION OF THE DRAWINGS

The above set forth and other features of the invention are made more apparent in the ensuing Description of the Preferred Embodiments when read in conjunction with the attached Drawings, wherein.

DETAILED DESCRIPTION OF THE PREFERRED EMBODIMENTS

Figure 1:
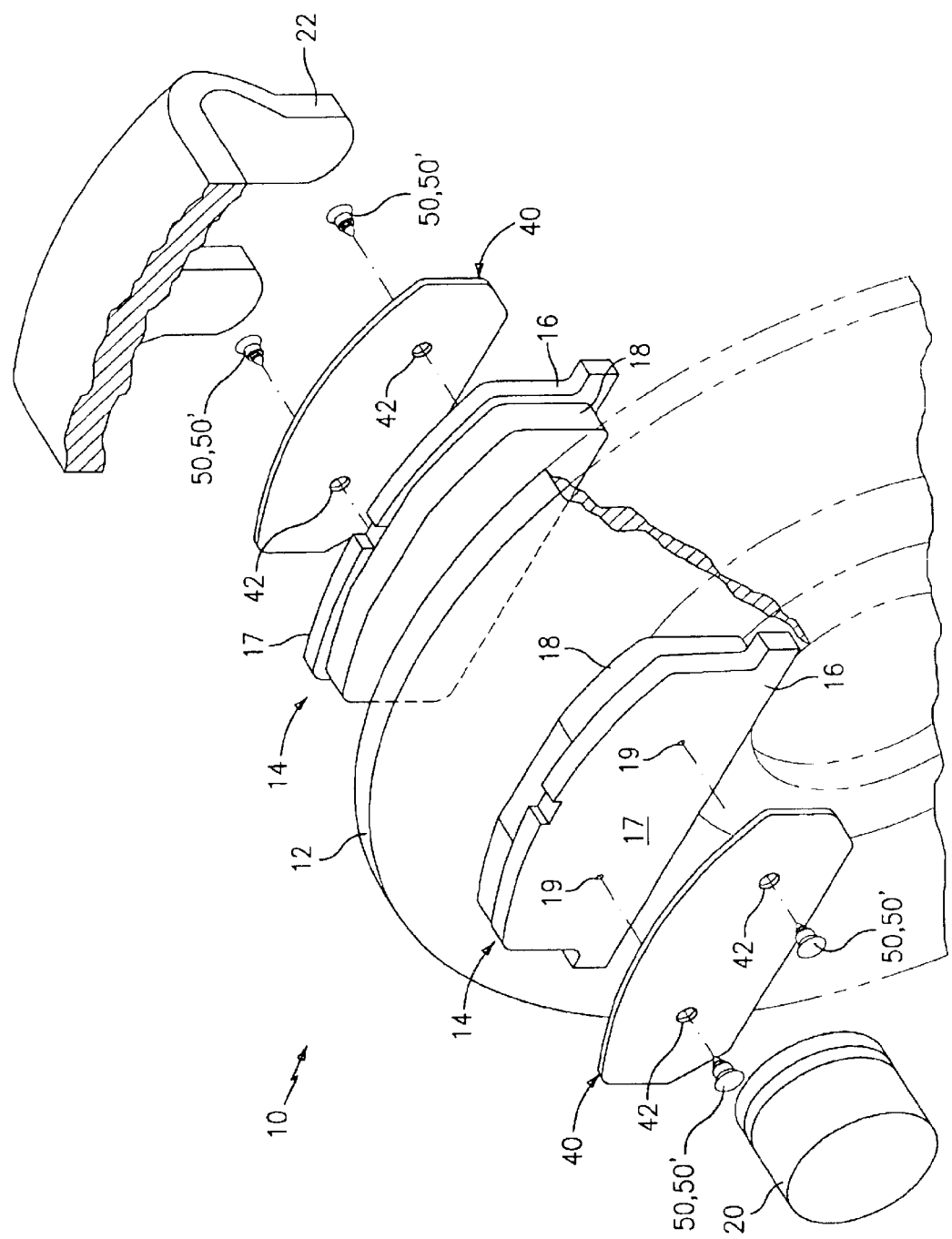
FIG. 1 is an exploded view of a brake assembly, such as a disc-brake assembly, generally illustrating the mechanical interlocking attachment of a shim and backing plate constructed in accordance with the present invention.

Reference is first made to FIG. 1 for a general exploded view of a disc-brake assembly, generally indicated at 10. As will become apparent, FIG. 1 also illustrates the present invention, namely one or more staples, each generally indicated at 50 or 50', constructed in accordance with the present invention and more particularly disclosed in FIGS. 2–7.

Generally speaking, disc brake assembly 10 comprises a rotatable disc 12 which rotates with the axle of a wheel to be braked. Assembly 10 also includes opposing braking subassemblies, generally indicated at 14. Each braking subassembly 14 comprises a steel backing plate 16 and a brake pad 18, with each brake pad 18 being mounted on the side of backing plate 16 facing disc 12. The two backing plates 16 may be suspended in a conventional caliper mounting structure by rods (not shown) which extend through backing plates 16, thus permitting backing plates 16 to move axially on the support rods, all of which would be well-known to one skilled in the art and need not be repeated herein. As would also be well understood, backing plates 16 are moved inwardly toward one another under the force applied by, for example, a hydraulically actuated piston 20 and a related caliper 22. In such a configuration, when piston 20 and caliper 22 press backing plates 16 inwardly, the inner surfaces of braking pads 18 are engaged in frictional, braking contact with disc 12.

As discussed above, a shim, illustrated by the reference number 40, is mounted on a back surface 17 of each respective backing plate 16 to reduce the brake squeal noise during such a braking or frictional engagement. Specifically, one shim 40 is preferably positioned between piston 20 and the piston facing (back) surface 17 of backing plate 16 while the other shim 40 is positioned between caliper 22 and the back surface 17 of its associated backing plate 16.

The present invention as will now be discussed, significantly reduces the likelihood that either shim 40 will become sheared or detached from its respective backing plate 16 during such a braking or frictional engagement.

Figure 2:
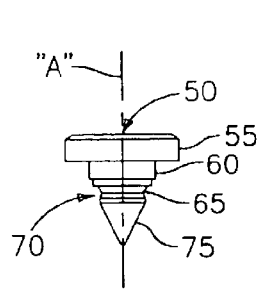
FIG. 2 is a plan view of a staple, used to mechanically interlock the shim and backing plate, constructed in accordance with a preferred embodiment of the present invention.
Figure 2A:
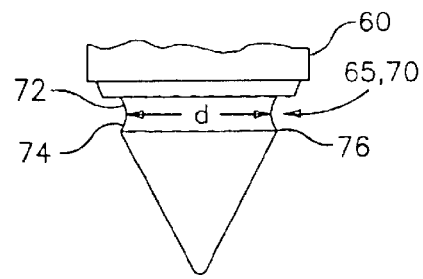
FIG. 2A is a magnified section of the staple of FIGS. 2 and 3.

Reference is therefore first made to FIGS. 2 and 2A for a description of a preferred construction of a staple, generally indicated at 50, constructed in accordance with a first embodiment of the present invention. Generally speaking and in accordance with the present invention, staple 50 assists in the mechanical coupling of shim 40 to (backside) surface 17 of its respective backing plate 16. In the preferred construction, staple 50 comprises a flat head section 55, a body section 65, coupled to head section 55, and having a concavity so as to form a recessed region 70 therein, and a leg member 75, shaped for permitting a portion of the material comprising backing plate 16 to be displaced upwardly towards and into recessed region 70 as leg member 75 pierces first (backside) surface 17 of, and progresses into, backing plate 16. As will be disclosed, upon insertion of body section 65 into backing plate 16, the concavity of the body section causes the displaced material to be forced downward to fill the recessed region 65, whereby shim 40 mounted onto backside surface 17 of either backing plate 16 and secured thereto at least in part by head section 55, is inhibited from movement on and separation from surface 17 of backing plate 16 thereby reducing the likelihood of the aforementioned shearing.

In particular, and with reference being specifically had to the magnified portion of staple 50 illustrated in FIG. 2A, body section 65 comprises an upper lip 72 extending outwardly from recessed region 70. As will be disclosed below, this upper lip 72 forces at least a portion of the displaced material towards and into recessed region 70 as staple 50 is being driven further into backing plate 16. Body section 65 also includes a lower lip 74 extending outwardly from recessed region 70. This lower lip 74 assists in maintaining the backing plate material in recessed region 70. In this way, pressure of the material in recessed region 70 against lower lip 74 assists in preventing staple 50 from being removed upwardly from backing plate 16.

To further detail the construction of staple 50, it can be seen that staple 50 has a longitudinal axis "A" (FIG. 2) extending from head section 55 through body section 65 and leg member 75. In accordance with the invention, the diameter "d" (FIG. 2A) of recessed region 70 is at least essentially, if not exactly, orthogonal to the longitudinal axis. This is directly contrary to the description set forth in U.S. Pat. No. 6,349,808 which by its downwardly spiraling veins, does not trap material of the backing plate in the manner of staple 50.

Preferably, the diameter "d" of recessed region 70 is less than the width of the base 76 of leg member 75. In this way, pressure of the material in recessed region 70 against a top surface of base 76 of leg member 75 assists in preventing staple 50 from being removed upwardly from backing plate 16.

Staple 50 may also include a shoulder region 60 formed intermediate head section 55 and body section 65. As will be illustrated below, shoulder region 60 assists in maintaining a proper orientation of shim 40 on backing plate 16.

In a preferred construction, staple 50 is integrally formed from C12L14 leaded steel which is heat treated and can be molded in accordance with conventional techniques.

Figure 3:
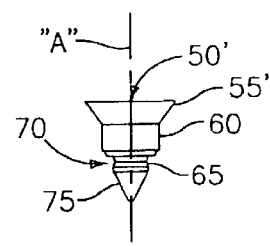
FIG. 3 is a plan view of a staple constructed in accordance with an alternative embodiment of the present invention.

Reference is briefly made to FIG. 3 to illustrate a staple, generally indicated at 50', constructed in accordance with an alternative embodiment of the present invention. Staple 50' is constructed identically in all material respects to staple 50. The only differences of staple 50' from staple 50 is that staple 50' has an angled head section 55' as opposed to flat head section 55. The advantages of each head section shape will be discussed in greater detail below. It should be understood that FIG. 2A also represents an enlarged portion of the staple of FIG. 3.

Figure 4:
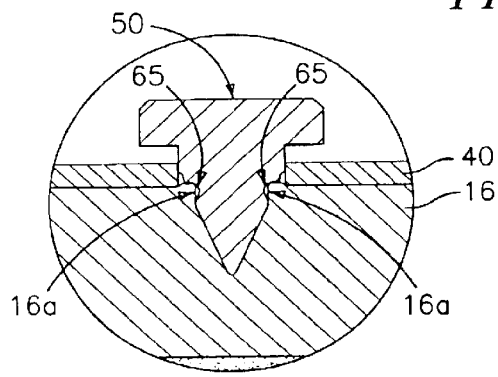
FIG. 4 is a cross sectional view showing a shim mounted on the back surface of a backing plate, with a staple, constructed in accordance with the embodiment of FIG. 3, being driven into and piercing the backside surface of a backing plate.
Figure 5:
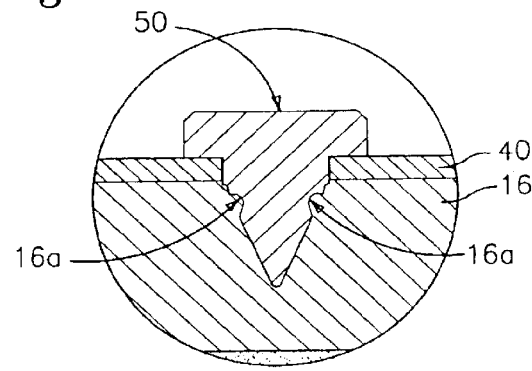
FIG. 5 is a cross sectional view showing the staple of FIG. 4 in a fully inserted position in the backing plate.

Reference is now made to FIGS. 4–5 for a description of the manner in which a staple of the configuration of staple 50, is inserted into and maintained in backing plate 16. Thereafter, reference will be made to FIGS. 6 and 7 for a disclosure of how staple 50' is inserted into and maintained in backing plate 16. As it will be understood, staple 50 is preferably used with a conventional shim while staple 50' is preferably used with a DRIFTLOK™ shim.

In accordance with the present invention, staple openings 42 (FIG. 1) are formed in each shim 40. In accordance with conventional shim and mounting methods therefor, the adhesive covered surface of shim 40 is placed on surface 17 of backing plate 16. Now, in accordance with the present methodology of an improved mechanical interlocking arrangement of shim 40 against backing plate 16, leg member 75 of staple 50, pierces first side surface 17 of backing plate 16. This is most clearly achieved by driving leg member 75 into first side surface 17 of backing plate by use of a kickpress or other driving device (not shown) which as would be understood in the art, may be manually operated or automated. While the back surface 17 of backing plate 16 may have small recessed dimples 19 (FIG. 1) that align with openings 42 so as to prevent slipping of staple 50 as it is driven into backing plate 16, importantly, backing plate 16 does not have receiving holes, such as those shown in U.S. Pat. No. 6,349,803. Because of this significant difference, the piercing of surface 17 by leg member 75 and the penetration thereof into backing plate 16 causes a portion of the backing plate material 16a to flow in a direction towards and into recessed region 70. This intermediate step is most clearly depicted in FIG. 4, wherein the displaced material can actually be seen to rise above the surface 17. As staple 50, and body section 65 in particular, continues to be driven into backing plate 16, displaced material 16a fills recessed region 70 of body section 65. Once staple 50 is driven into backing plate 16 sufficiently so that head section 55 is abutting shim 40 (FIG. 5), staple 50 is resisted from being removed from backing plate 16 and shim 40 mounted onto first side 17 of backing plate 16 is maintained thereagainst by contact of head section 55 against the top surface of shim 40 and the adhesive layer.

In particular, the method of the present invention includes causing leg member 75 to continue to pierce through and progress into backing plate 16 so as to cause displaced material 16a to flow towards and into the recessed region. In a specific methodology, material 16a flows above the first surface of the backing plate and thereafter, the continued piercing of the leg member into plate 16 causes the portion of the displaced material extending above the first surface of the backing plate to be forced into recessed region 70 due to upper lip 72. Once the body section is below the first surface 17 of backing plate 16, any continued piercing through and progression into the backing plate by leg member 75 causes displaced material to flow and be forced towards and into recessed region 70.

The forcing of the displaced material into the recessed region of the body section is achieved by upper lip 72, which as disclosed above, extends outwardly from recessed region 70. That is, upper lip 72 forces at least a portion of the displaced material towards and into the recessed region. In this way, any material flowing in a direction towards the upper lip as leg member 75 is piercing backing plate 16 is forced into recessed region 70 by upper lip 72. Lower lip 74 extends outwardly from recessed region 70 to maintain the material in the recessed region. In this manner, the pressure of the material in recessed region 70 against lower lip 74 assists in preventing staple 50 from being removed from backing plate 16.

Figure 6:
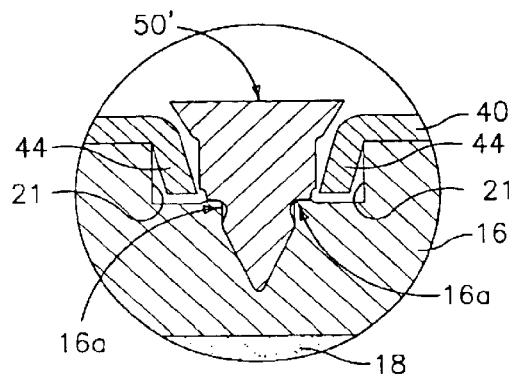
FIG. 6 is a cross sectional view showing the staple of FIG. 3 being driven into and piercing the backside surface of a backing plate.
Figure 7:
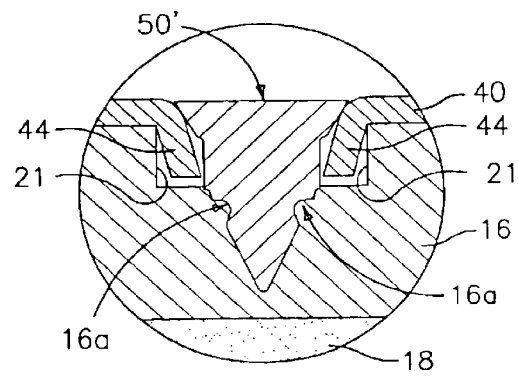
FIG. 7 is a cross sectional view showing the staple of FIG. 6 in a fully inserted position in the backing plate.

Referenced is briefly now made to FIGS. 6 and 7 to illustrate how staple 50' can be advantageously used in connection with the present invention, in particular, when shim 40 utilizes the advantages of a DRIFTLOK™ shim. Specifically, staple 50' is driven into backing plate 16 in the same manner as staple 50. Accordingly, the method of maintaining a shim against the first (backside) surface 17 of backing plate 16 with staple 50' is similar. However, from a review of FIGS. 6 and 7, one distinct difference becomes apparent. Since a DRIFTLOK™ shim has holes 42 with radial flange 44, it is advantageous to utilize an angled head section 55'. Also, but in no way does it alter the advantages of the present invention or the methodology of use thereof, indentations 21 may be formed in backing plate 16 to provide alignment and receipt of flange 44. However, again, the important feature remains, namely, that staple 50' must pierce and be inserted into the surface 17 of backing plate 16 for the invention to work satisfactorily. As can therefore be seen, the bottom angled surface of head section 55' actually allows the top surface of head section 55' to lie at least substantially flush with the top surface of the shim and head section 55' does indeed assist in maintaining shim 40 against surface 17 of backing plate 16. In all material respects, staple 50' and 50 operate similarly. The shoulders 60 of each staple help maintain the alignment of the shim on the backing plate.

Each staple functions to resist shifting or rotation of shim 40 on backing plate 16. At least one, but preferably at least two, staples are preferred with each braking subassembly 14. By utilizing staples, such as those configured in FIG. 3, in combination with a DRIFTLOK™ shim, the substantially flush positioning of the top surface of staple 50' with the top surface of shim 40 does not interfere with the positioning or functioning of piston 20 or caliper 22 or other disc brake structure relative to the surface of shim 40 and also may decrease the shear forces tending to separate shim 40 from backing plate 16 by the vibrations incurred during braking of disc brake assembly 10.

Preferably, the staples are comprised of a harder material than backing plate 16 so that insertion of the staple into backing plate 16 causes material to flow upwardly towards recessed region 70. Moreover, each staple needs to be of a harder material so as to resist deformation in the backing plate. Also, each staple may be driven straight into backing plate 16 since the recessed region is orthogonal to the longitudinal axis of the staple.

One skilled in the art would clearly know how to construct a suitable shim, as this person would know that shims may be comprised of multi-layer materials, such as aluminum, metal alloys, laminates or layers of metals and adhesive and other materials, such as plastic if desirable, with the adhesive being of acrylic, thermal setting adhesive, or a combination of both.

While the invention has been particularly shown and described with respect to preferred embodiments thereof, it will be understood by those skilled in the art that changes in form and details may be made therein without departing from the scope and spirit of the invention.

It can now be seen that a staple constructed in accordance with the present invention improves the mechanical interlocking arrangement between a shim and a backing plate in a brake assembly, such as a disc-brake assembly. In particular, the present invention further reduces the likelihood of shearing between the shim and backing plate during frictional engagement of the brake pads and the disc. Furthermore, the present invention provides for alternative embodiments so as to be useable with a variety of shim constructions, such as those mentioned above, wherein the head section of the staple may be flush with the top surface of the shim so as to not interfere with the piston, caliper or other disc brake structure. Alternatively, if such function is not needed or a shim such as the DRIFTLOK™ shim is not used, a staple such as that disclosed in FIG. 2 can be used. As can therefore be seen any shim structure can be used.

Staples made in accordance with the present invention are also preferably made from materials, i.e. C12L14 leaded steel which is heat treated, that are harder than that of the backing plate so as to prevent deformation upon insertion of the backing plate, since the backing plate, in accordance with the present invention, does not utilize predrilled holes. This permits the displacement and trapping of backing plate material as disclosed above.

What is claimed is:

1. A method of forming a braking subassembly for use in a brake assembly, the method comprising the steps of:
   providing a shim comprised of a multilayered material, wherein the shim has a first side and a second side and at least one aperture extending therethrough, wherein the shim includes at least one countersunk region and wherein the at least one aperture is formed in the countersunk region;
   providing at least one staple comprised of a head section, a body section coupled to the head section, the body section having a concavity so as to form a recessed region therein, and a leg member;
   placing the second side of the shim proximate a first side surface of a backing plate comprising at least one indentation formed therein to provide alignment and receipt of the at least one countersunk region of the shim, and aligning the at least one countersunk region of the shim with the at least one indentation formed in the backing plate so that the shim and the backing plate are aligned and the second surface of the shim is against the first side surface of the backing plate;
   piercing the backing plate by driving the leg member of the staple into the backing plate so that a portion of the material comprising the backing plate flows in a direction towards and into the recessed region;
   causing the body section to be driven into the backing plate so that displaced material fills the recessed region of the body section and a top surface of the head section lies at least substantially flush with the first side of the shim;
   wherein the shim is resisted from movement at least in part by the countersunk region being positioned in the indentation and the staple is resisted from being removed from the backing plate, and the shim mounted onto the first side surface of the backing plate is maintained thereagainst at least in part by contact of the head section against the shim.

2. The method as claimed in claim 1, including the steps of:
   providing in connection with said shim, at least a second aperture extending therethrough, wherein the shim includes at least a second countersunk region and wherein the at least second aperture is formed in the at least second countersunk region;
   providing at least a second staple comprised of a head section, a body section coupled to the head section and having a concavity so as to form a recessed region therein, and a leg member;
   aligning the at least second countersunk region of the shim with a second indentation formed in the backing plate when the second side of the shim is placed proximate the first side surface of the backing plate;
   piercing the backing plate by driving the leg member of the second staple into the backing plate so that a portion of the material comprising the backing plate flows in a direction towards and into the recessed region of the second staple; and
   causing the body section of the second staple to be driven into the backing plate so that displaced material fills the recessed region of the body section of the second staple and a top surface of the head section of the second staple lies at least substantially flush with the first side of the shim;
   wherein the shim is further resisted from movement at least in part by the second countersunk region being positioned in the second indentation and the staple is further resisted from being removed from the backing plate at least in part by contact of the head section of the second staple against the shim.

3. The method as claimed in claim 1, including the steps of:
   causing the leg member to continue to pierce through and progress into the backing plate so that displaced material flows above the first side surface of the backing plate and wherein the displaced material extending above the first surface of the backing plate thereafter is forced towards and into the recessed region.

4. The method as claimed in claim 1, including the steps of:
   causing the leg member to continue to pierce through and progress into the backing plate so that displaced material flows towards and into the recessed region of the body section.

5. The method as claimed in claim 1, wherein the head section of the staple has an angled surface so that the top surface of the head section can lie at least essentially flush with the first side of the shim.

6. The method as claimed in claim 5, including the step of causing the leg member to pierce through and progress into the backing plate so that the angled surface leg below the top surface of the first side of the shim.

7. A method of maintaining a shim against a first side surface of a backing plate wherein the backing plate comprises at least a first indentation and a second indentation, the method comprising the steps of:

provided a shim, wherein the shim has a first side and a second side and at least a first aperture and a second aperture through the shim, wherein the shim includes at least two countersunk regions and wherein each of the first and second apertures are formed in a respective one of the countersunk regions;

providing at least two staples each comprised of:
a head section, a body section coupled to the head section and having a concavity so as to form a recessed region therein, and a leg member;

placing the second side of the shim proximate a first side surface of the backing plate, aligning the first countersunk region of the shim with the first indentation and aligning the second countersunk region of the shim with the second indentation so that:
the shim and the backing plate are aligned,
the first countersunk region is received in the first indentation, and
the second countersunk region is received in the second indentation; and with respect to each of the first and second staples:
driving the leg member into the backing plate so that a portion of the material comprising the backing plate flows in a direction towards and into the recessed region;
driving the body section into the backing plate so that displaced material fills the recessed region of the body section and a top surface of the head section lies at least substantially flush with the first side of the shim;
wherein the shim is resisted from movement at least in part by the first and second countersunk regions being positioned in the respective indentations and the staple is resisted from being removed from the backing plate, and the shim mounted onto the first side surface of the backing plate is maintained thereagainst at least in part by contact of the head section against the shim.

8. A method of forming a braking subassembly for use in a brake assembly, wherein the braking assembly comprises a shim comprised of a multilayered material, wherein the shim has a first side and a second side and at least one aperture extending therethrough, wherein the shim includes at least one countersunk region and wherein the at least one aperture is formed in the countersunk region, and at least one staple comprised of a head section, a body section having a concavity so as to form a recessed region therein, and a leg member; wherein the method comprises the steps of:

placing the second side of the shim proximate a first side surface of a backing plate comprising at least one indentation formed therein to provide alignment and receipt of the at least one countersunk region of the shim, and aligning the at least one countersunk region of the shim with the at least one indentation formed in the backing plate so that the shim and the backing plate are aligned and the second surface of the shim is against the first side surface of the backing plate;
piercing the backing plate by driving the leg member of the staple into the backing plate so that a portion of the material comprising the backing plate flows in a direction towards and into the recessed region;
driving the body section into the backing plate so that displaced material fills the recessed region of the body section and a top surface of the head section lies at least substantially flush with or lower than a top surface of the first side of the shim;
whereby the shim is resisted from movement at least in part by the countersunk region being positioned in the indentation, the staple is resisted from being removed from the backing plate, and the shim mounted onto the first side surface of the backing plate is maintained thereagainst at least in part by contact of the head section against the shim.

9. The method as claimed in claim 8, wherein the shim comprises at least a second aperture extending therethrough, at least a second countersunk region and wherein the at least second aperture is formed in the at least second countersunk region; wherein the method comprises the steps of:

aligning the at least second countersunk region of the shim with a second indentation formed in the backing plate when the second side of the shim is placed proximate the first side surface of the backing plate;
piercing the backing plate by driving a leg member of a second staple, which itself also comprises a head section and a body section having a concavity so as to form a received region therein, into the backing plate so that a portion of the material comprising the backing plate flows in a direction towards and into the recessed region of the second staple; and
driving the body section of the second staple into the backing plate so that displaced material fills the recessed region of the body section of the second staple and a top surface of the head section of the second staple lies at least substantially flush with or lower than the top surface the first side of the shim.

10. The method as claimed in claim 8, including the steps of:
causing the leg member to continue to pierce through and progress into the backing plate so that displaced material flows above the first side surface of the backing plate and wherein the displaced material extending above the first surface of the backing plate thereafter is forced towards and into the recessed region.

11. The method as claimed in claim 8, including the steps of:
causing the leg member to continue to pierce through and progress into the backing plate so that displaced material flows towards and into the recessed region of the body section.

12. The method as claimed in claim 8, wherein the head section of the staple has an angled surface so that the top surface of the head section can lie at least essentially flush with or lower than the first side of the shim.

13. The method as claimed in claim 12, including the step of causing the leg member to pierce through and progress into the backing place so that the angled surface leg below the top surface of the first side of the shim.

14. A method of maintaining a shim against a first side surface of a backing plate with at least one staple comprised of a head section, a body section having a concavity so as to form a recessed region therein, and a leg member, wherein the backing plate comprises at least one indentation, and the shim comprises a first side and a second side and at least one aperture therethrough, wherein the shim includes at least one countersunk region and wherein the at least one aperture is formed in the at least one countersunk region, wherein the method comprises the steps of:

placing the second side of the shim proximate a first side surface of the backing plate, aligning the at least one countersunk region of the shim with the at least one indentation so that the shim and the backing plate are aligned and the at least one countersunk region is received in the at least one indentation;

driving the leg member into the backing plate; and driving the body section into the backing place so that displaced material fills the recessed region of the body section, and a top surface of the head section lies at least substantially flush with or lower than a top surface of the first side of the shim;

whereby the shim is resisted from movement at least in part by the at least one countersunk region being positioned in the at least one indentation, the staple is resisted from being removed from the backing plate, and the shim mounted onto the first side surface of the backing plate is maintained thereagainst at least in part by contact of the head section of the staple against the shim.

* * * * *